United States Patent [19]

Adachi

[11] Patent Number: 4,693,300
[45] Date of Patent: Sep. 15, 1987

[54] METHOD AND APPARATUS FOR SPRINKLERLESS SNOW CONTROL
[75] Inventor: Hideo Adachi, Tokyo, Japan
[73] Assignee: Nippon Flute, Co., Iruma, Japan
[21] Appl. No.: 892,851
[22] Filed: Aug. 4, 1986
[51] Int. Cl.⁴ .............................................. F28D 1/00
[52] U.S. Cl. ......................................... 165/1; 165/45; 165/71
[58] Field of Search ................................ 165/1, 45, 71

[56] References Cited
U.S. PATENT DOCUMENTS

| | | | |
|---|---|---|---|
| 2,954,680 | 10/1960 | Ruff | 165/45 X |
| 3,626,149 | 12/1971 | Carney et al. | 165/45 X |
| 3,683,152 | 9/1972 | Laing . | |
| 3,758,748 | 9/1973 | Reid | 165/45 X |
| 3,993,122 | 11/1976 | Svenstam | 165/45 |
| 4,022,025 | 5/1977 | Greene . | |
| 4,060,988 | 12/1977 | Arnold | 165/45 X |
| 4,305,681 | 12/1981 | Backlund . | |
| 4,476,921 | 10/1984 | Stubbold | 165/45 X |
| 4,489,568 | 12/1984 | Shapess . | |
| 4,538,673 | 9/1985 | Partin et al. . | |

FOREIGN PATENT DOCUMENTS 57-148126  9/1982  Japan ................................... 165/45

OTHER PUBLICATIONS
Utah State University, "Groundwater Heat Pump", M. E. Dept. (Dec. 1979).

Primary Examiner—Albert W. Davis, Jr.
Assistant Examiner—Richard R. Cole
Attorney, Agent, or Firm—Bradford E. Kile

[57] ABSTRACT

A preferred embodiment of the invention comprises a sprinklerless snow control system for reducing the buildup of snow upon an exterior surface such as a roadway, parking lot, roof structure or the like including a water lift well extending beneath the surface of the earth and positioned adjacent to an exterior surface to be protected from the buildup of snow. A pump is positioned wiithin the water lift well to raise relatively warm subsurface water having a temperature greater than freezing from the earth and delivering the relatively warm water into a conduit heat exchange system positioned beneath an exterior surface to be protected from snow buildup. At least one recharging well is positioned adjacent to the exterior surface to be protected and receives water from the conduit system positioned beneath the surface to be protected for permitting the water to re-enter the ground to be recharged with solar and/or geothermal heat stored within the ground. A non-return valve is positioned at a highest point between the pump and the heat exchange conduit system for permitting venting or drainoff of the system and air to enter the heat exchanger conduit system upon termination of subsurface water pumping. A vacuum relief means is provided for preventing a vacuum from being created within the water lift well in the event the well system is covered with snow accumulation or the like.

19 Claims, 8 Drawing Figures

METHOD AND APPARATUS FOR SPRINKLERLESS SNOW CONTROL

BACKGROUND OF THE INVENTION

The present invention relates to a system and method for controlling the buildup of snow upon an exterior surface such as a paved roadway, driveway, parking lot, roof structure and other similar facilities by utilizing the solar and/or geothermal energy absorbed and stored within underground water without providing additional heating of the ground water by artifical means and without sprinkling the water upon the snow to be melted.

In the past various techniques have been theorized and, to some extent, utilized for melting and/or controlling the buildup of snow upon an exterior surface such as a roadway or the like. In at least one previously known technique, snow is melted by supplying steam through pipelines embedded within a roadway surface. Another technique envisioned in the past has been to utilize electrical resistance heating elements embedded within a roadway surface. Still another technique of snow melting, which has gained a degree of exceptence on the Japanese Honshu Island facing the Sea of Japan, is a procedure whereby well water, without artificial heating, is sprinkled upon surface aras of heavy snow accumulation.

Although the above prior techniques have achieved a degree of desirable results, problems have also been occasioned. In this connection, conventional procedure for melting snow upon roadways or similar facilities utilizing steam heat requires a system for generating steam and supplying steam to pipes embedded within the roadway surface. The initial capitalization to build and maintain such a system is prohibitive for most applications and as a consequence it is believed that the utilization of steam to melt roadway snow is more theoretical than practical. A similar procedure has been known wherein hot air is designed to be channeled through buried conduits and/or blown directly upon the exterior of a roadway. This procedure also requires costly facilities to heat the air and distribute the heated air to a desired location in an effective manner.

Electrical resistance heating procedures can be a more practical technique to melt show on a roadway surface but considerable limits exist in this application as well. More Particularly, problems have been realized with regard to maintaining electrical integrity within a roadway which is subject to movement, Moreover, resistance heating costs can be prohibitive for large areas.

A method of melting snow by sprinkling water, either well water or river water, directly upon a surface to be freed from snow accumulation is not believed to be well known in the United States but is rather widely used at heavy snowfall areas in Japan. An example of this system comprises the melting of snow upon a railway bed. More specifically, the Japan National Railroad Corporation uses a method of water sprinkling in the area of Niigata Prefecture for protecting the railroad of the Super Express Line. In this system, water is pressurized and supplied through piping to an area along the railroad to sprinkle water onto the rail and its nearby area. The water which is sprinkled upon the rail is not artificially heated but continuous sprinkling water is needed to prevent the rail and water sprinkling equipment from icing over.

Another snow melting technique which has been utilized in Japan features a method of the type described above wherein ground water is sprinkled upon roadways for vehicular traffic in urban areas of heavy snowfall. A specific example of this type of installation can be seen again in the Niigata Prefecture which is located in the central zone of Honshu Island of Japan facing the Sea of Japan where snow falls as much as ten feet high or more. In this application, water supply pipes are laid along the center line of the roadway and water is sprinkled through apertures of small diameter provided through the pipes such that the ground water spray suitably covers an area of snow accumulation. This method of snow removal or snow melting by sprinkling water on roads and the like has occasioned some difficulties with maintenance. More specifically, problems are encountered in preventing ice from clogging the water nozzles. Additionally, eroded and irregular apertures in the water pipes due to corrosion can be a problem. Still further, the nozzles or holes in the piping system may be intermeitantly covered or clogged when the system is out of service.

The difficulties suggested in the preceding are not intended to be exhaustive, but rather are among many which tend to reduce the effectiveness and user satisfaction of prior passive snow removal systems. Other noteworthy problems may also exist; however, those presented above should be sufficient to demonstrate that passive snow removal system and processes appearing in the past will admit to worthwhile improvement.

OBJECTS OF THE INVENTION

It is therefore a general object of the invention to provide a novel system and process for passive snow removal which will obviate or minimize difficulties of the type previously described.

It is a specific objects of the invention to provide a novel system and process for minimizing snow accumulation wherein artificial or supplemental heating of underground water and/or sprinkling of underground water is obviated.

It is a further object of the invention to provide a novel passive snow removal system and process wherein the system is relatively maintenance free and minimizes a tendency to become ice blocked and/or clogged due to oxidation accumulations.

It is another object of the invention to provide a novel system and process for minimizing snow accumulation which effectively utilizes solar thermal energy stored within underground water and/or geothermal energy provided by upper ground temperatures.

It is yet another object of the invention to provide a novel passive snow removal system and process for utilization in areas where natural underground water is not in plentiful supply.

It is yet a further object of the invention to provide a novel system and process for using subsurface water to minimize snow accumulation upon a roadway surface or the like wherein ground water heat is uniformly transferred to a roadway surface to melt snow upon the surface.

It is a related object of the invention to provide a novel process and system wherein ground water is efficiently recycled from a lifting well through a heat exchange system and back to the ground for reheating through a plurality of recharging wells.

BRIEF SUMMARY OF A PREFERRED EMBODIMENT OF THE INVENTION

A preferred embodiment of the invention which is intended to accomplish at least some of the foregoing objects comprises a sprinkerless snow control system for reducing the buildup of snow upon an exterior surface such as a roadway, parking lot, roof structure or the like including a water lift well extending beneath the surface of the earth and positioned adjacent to an exterior surface to be protected from the buildup of snow. A pump is positioned within the water lift well to raise relatively warm subsurface water having a temperature greater than freezing from the earth and delivering the relatively warm water into a conduit heat exchange system positioned beneath an exterior surface to be protected from snow buildup. At least one recharging well is positioned adjacent to the exterior surface to be protected and receives water from the conduit system positioned beneath the surface to be protected for permitting the water to re-enter the ground to be recharged with solar and/or geothermal heat stored within the ground. A non-return valve is positioned at a highest point between the pump and the heat exchange conduit system for permitting venting or drainoff of the system and air to enter the heat exchanger conduit system upon termination of subsurface water pumping. A vacuum relief means is provided for preventing a vacuum from being created within the water lift well in the event the well system is covered with snow accumulation or the like.

A method in accordance with a preferred embodiment of the invention includes the steps of positioning a heat exchange conduit system within a surface to be protected from snow buildup and pumping relatively warm subsurface water, having a temperature greater than freezing, from the earth and into the heat exchanger conduit system. Following heat transfer of the relatively warm subsurface water through the conduit system, the cooled subsurface water is discharged into at least one recharging well for being reheated by solar or geothermal energy contained within upper ground regions. A non-returned valve is maintained in a upper most position between the water lift well and the heat exchange conduit system and a vacuum is prevented from forming adjacent the non-return valve such that air can enter the conduit system upon termination of ground water pumping operations to allow the system to automatically drain and thus prevent freezing of the conduit system.

THE DRAWINGS

Other objects and advantages of the present invention will become apparent from the following detailed description of preferred embodiments thereof, taken in conjunction with the accompanying drawings, wherein.

DETAILED DESCRIPTION

Figure 1:
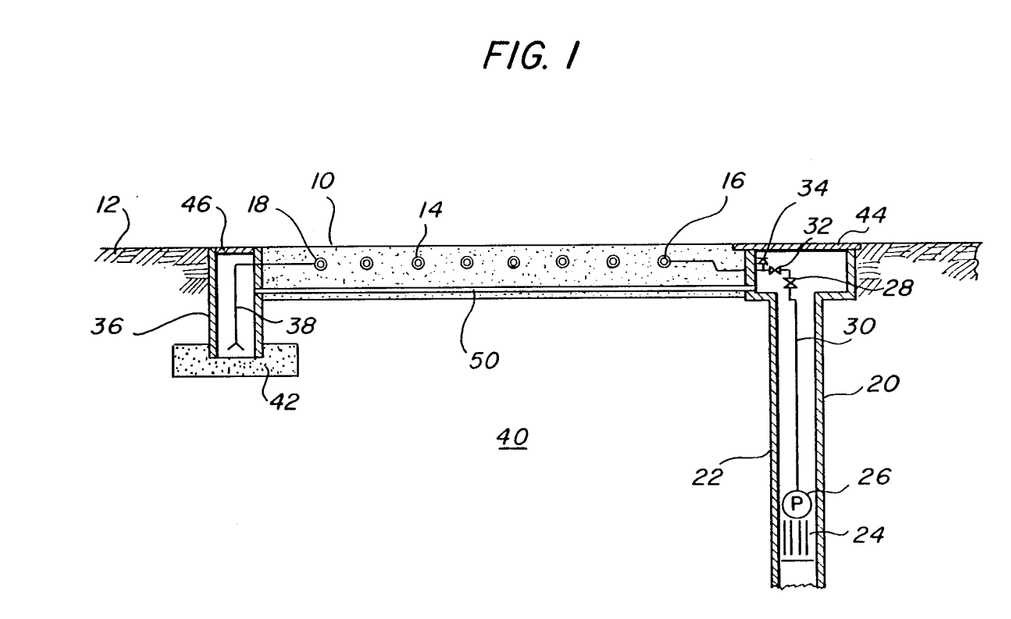
FIG. 1 is a sectional view of one preferred embodiment of the invention including a water lift well positioned adjacent a roadway surface and an embedded heat exchange conduit system within the roadway surface and a recharging well positioned downstream of the conduit surface to return the ground water to the earth for reheating.
Figure 4:
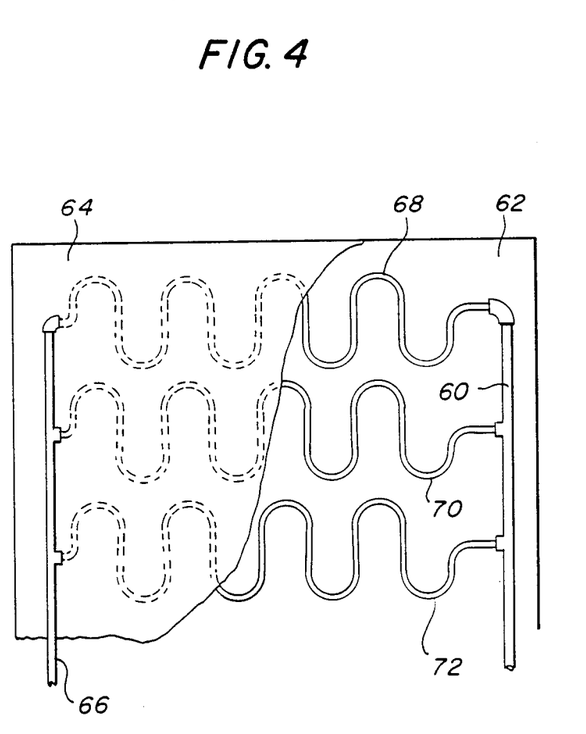
FIG. 4 is a plan view of a heat exchange conduit system, such a depicted in FIG. 1, including a main supply pipe and a water return pipe which are connected by a plurality of transversely extending, sinusoidally shaped, heat transfer pipes.

Referring now to FIG. 1 of the drawings, a sectional illustration of a snow removal system is depicted in accordance with a preferred embodiment of the invention. More specifically, a roadway, walkway, parking lot or similar structure 10 is fabricated from a composition material and laid upon a ground surface 12 in a rather conventional manner. A heat exchange conduit system 14 is embedded within the composition and preferably is in the form of a back and forth tortuous path continuous conduit having a first end 16 to a second end 18. As an alternative to a continuous single tortuous path conduit system 14, a plurality of sinusoidal transverse conduits may extend between an initial 16 and final 18 conduit such as generally illustrated in FIG. 4 which will be discussed more fully below.

A water lifting well 20 is positioned adjacent to the roadway 10 and operably includes a casing 22 which may be of a porous metallic or cementitous design which is well known to those of ordinary skill in the art. The well 20 may operably extend to an underground aquifer but in a preferred mode extends no deeper than 30 meters, or so. A plurality of well rods 24, containing a filtering media or screen, extend at a bottom most portion of the well and feed directly into a pump 26, of a conventional design, which is operable to pump water, at the surrounding ground water temperature, to a surface location.

A main water valve 28 can be positioned in the water line 30 downstream of pump 26 and serves to actuate the overall system as desired. A distributing valve 32 is also provided when the main valve operably delivers water into a manifold system, not shown. A non-return valve 34 is positioned downstream of the main valve and is placed in a highest or uppermost posture prior to delivery of fluid into the heat exchange conduit system 14.

As previously indicated the conduit system preferably comprises the winding back and forth of a single conduit which, when shown in cross section, reveals only the exterior diameters of the conduit as illustrated in FIG. 1. The conduit system 14 terminates in a position remote from the water lifting well and delievers heat spent water into a recharging well 36 which is operable to receive a downpipe 38 for delivery of ground water back into the earth bulk 40. In this connection a bed of gravel 42 or similar material, is positioned downstream of pipe 38 and operably serves to dissipate fluid from within the recharging well 36 into the surrounding earth.

Water exiting from the recharging well 36 enters the earth bulk and eventually migrates toward the water lift well 22. During the slow migration process, the water is reheated to a temperature of the earth bulk which coincides with solar and/or geothermal energy which is stored within the earth in locations adjacent to the earth surface. This temperature is typically at about 60 degrees Fahrenheit. The lifting well is covered with a cap 44 to prevent clogging and depris from entering the well and in a similar manner a cap 46 is positioned over the recharging well 36.

In the embodiment depicted in FIG. 1, subsurface water is pumped from the water lifting well 20 upwardly and into the tortuous path heat exchange conduit system 14. The water, at approximately 60 degrees Fahrenheit, traverses through the conduit system from an entrance location at 16 to an exit at 18. During this traversing path, heat is liberated into the surrounding composition 10 which thereby serves to prevent the accumulation of snow upon the exterior surface of the composition 10 by melting the snow as it falls and/or shortly following falling to minimize the possibility of a substantial snow accumulation upon the composition 10. As heat is withdrawn from the conduit system the water is cooled and exits the system at 18 in a relatively cooled state. The chilled water is then delivered back into the recharging well and recycled through the earth bulk to reheat the water back to a temperature at approximately 60 degrees Fahrenheit.

In the event the flow of water through the conduit system is halted during periods of no snow, by either actuating the main valve 28 and/or distributing valve 32, water within the conduit system 14 is free to return by gravity from the inlet 16 to outlet 18. This gravitational release of fluid within the conduit system is achieved by maintaining the height of the inlet 16 above the height of the exit 18. In order to prevent a vacuum from being created within the conduit system as water exits into the recharging well by gravity, the one way valve 34 permits air to enter into the conduit system. Accordingly, water within the system will not freeze during clear periods even at very low temperatures because there will be no water within the conduit system.

In some instances where snow or ice is built up along the edges of the roadway, and/or the water lift well is covered with sludge or the like, it would be possible for a vacuum to be created within the well 20 as water drains from the conduit system. If this occurrs, the vacuum would tend to hold water within the conduit system and/or prevent its rapid discharge upon termination of water pumping operations. Slow drainage might permit freezing of the water within the conduit system. In order to prevent the creation of a vacuum within the lift well an air relief conduit 50 extends between the water lifting well 20 and at least one recharging well 36 to equalize the air pressure between the two wells.

Figure 2:
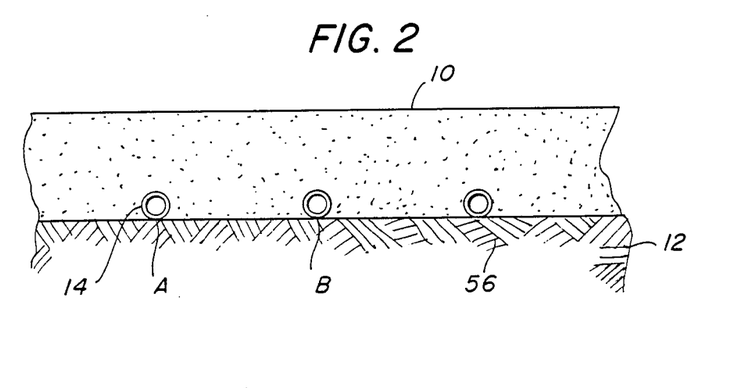
FIG. 2 is a cross-sectional detail view of placement of the heat exchange conduit system in a location between a roadbed and a surface paving composition of enhanced thermal transfer characteristics.

Turning now to FIG. 2, there will be seen an embodiment to the subject invention wherein an enhanced heat conductive composition 10 has been laid directly upon the upper surface of a normal roadway bed 56. The composition 10 is composed of a mixture of paving asphalt with additives to impove the heat conductivity of the mixture. In this connection, it has been found that the conductivity of the asphalt can be increased by mixing with it a combination of a polyolefin resin and a neoprene resin. The amount of polyolefin and neoprene should be not less than 10% and 5% by weight respectively and no greater than 30% and 15%, by weight, and preferably the polyolefin resin is 20% of the overall composition 10, by weight, while the neoprene is 10% by weight. It has been found that these ratios enhance the heat conductivity from the heat exchange conduit system 14 to the exterior surface 10 of the roadway or the like.

The conduit system 14 is preferably composed of stainless steel tubing and in a preferred embodiment the inside diameter of the tubing is 13 millimeters while the thickness of the pipe wall is 0.8 millimeters. The distance between adjacent runs of the conduit represented at points A and B is preferably 15 centimeters and the thickness of the pavement composition with the preferred asphalt, polyolefin and neoprene resin is 5 centimeters.

Assuming that the temperature of the ground water flowing in the pipes is approximately 12 degrees C. and the ambient air temperature is minus 3 degrees C., the heat transmission rate at the ground surface is approximately 120 to 200 kilocalories per meter square degrees C. grade per hour which are experimental values and the transmitted calories and temperature and surface of the pipe may be calculated from equations (1), (2) and (3) as discussed below.

$$Q = (K_1 + K_2)(t_0 - t_1) \cdot A/2 \tag{1}$$

$$1/K = 1/\alpha_2 + r_1/\lambda \cdot \ln(r_1/r_0) + 1/\lambda + r_1/r_0 \cdot \alpha_1 \tag{2}$$

$$T = t_1 + (t_0 - t_1) \cdot K/\alpha_2 \tag{3}$$

Wherein:
  Q: The average total heat quantity transmitted to the ground surface [Kcal/m$^2$.h]
  K: The overall heat transfer coefficient [Kcal/m$^2$.°C.h]
  $K_1$: Overall heat transfer coefficient at the part right above the pipes [Kcal/m$^2$.°C.h]
  $K_2$: Overall heat transfer coefficient at a part right above a mid point of the pipes [Kcal/m$^2$.°C.h]
  T: The temperature of the ground surface. [°C.]
  $t_0$: The temperature of the water in the pipes [°C.]
  $t_1$: The temperature of the ambient air [°C.]
  A: Total areas, the ground surface area and its equal at the surface of the road bed, to which the heat of the groundwater is transmitted. [m$^2$]
  $\alpha_1$: Heat transfer coefficient [Kcal/m$^2$.°C.h] of the inside of pipes.
  $\alpha_2$: Heat transfer coefficient of the ground surface [Kcal/m.°C.h]
  $r_0$: Radius of the pipe [m]
  $r_1$: Length of the radius O P$_5$ [m]
  l: Length of the arc P$_6$ P$_2$ [m]
  λ: The thermal conductivity of the paving material. [Kcal/m$^2$.°C.h]

Figure 3:
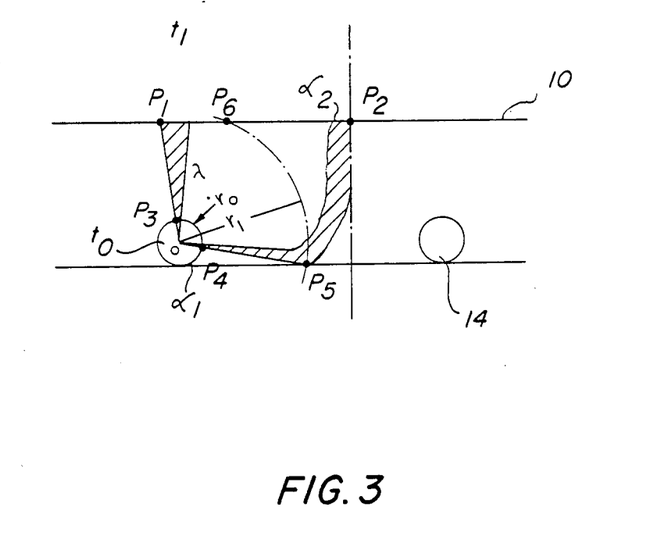
FIG. 3 is a graph depicting a theoretical explanation of the transmission of heat of ground water through the surface composition to melt snow upon the exterior surface of the composition.

FIG. 3 is a graphical illustration and solution to equations (1), (2) and (3) used in the description of FIG. 2. Equation 1 is for obtaining the average total heat transmission to the ground surface. Equation 2 is for obtaining a combined result of the heat transmitted through the pipe by graphical solution from the point O to the point $P_5$, and beyond the point $P_5$. $P_5$ $P_2$ indicates the heat transmitted to the ground surface as the heat transmission at the plane surface area. Equation 3 is for obtaining the temperature of the ground surface from the heat transmission rate of the ground surface and the transmitted heat quantity.

Referring to FIG. 3, the point $P_5$ is graphically obtained by drawing the line segment $P_2$ $P_6$ equal to the arc $P_2$ $P_5$.

FIG. 4 is a plan view, partially broken away to reveal internal detail, of a roadway surface or roofing surface of a residential home which may advantageously employ a heat exchange conduit system and source of passive snow removal in accordance with the instant invention. In this connection, an inlet conduit or water manifold 60 extends along one edge of a roof, deck or the like 62 and a composition of a type similar to that previously discussed is laid upon the roof structure 62. A return manifold 66 is positioned upon an opposing side of the roof 62 and operably serves to return water to a recharging well as previously discussed.

In order to provide a heat exchange between the relatively warm subsurface water entering the inlet manifold 60 and the exterior surface 64 of the composition, a plurality of transversely extending sinusoidal conduits 68, 70 and 72 extend in a tortuous but generally mutually parallel posture across the panel. The heat exchange piping system may be composed of stainless steel or copper tubing which is satisfactory for transmitting heat between the ground water and the overlaying composition.

Figure 5:
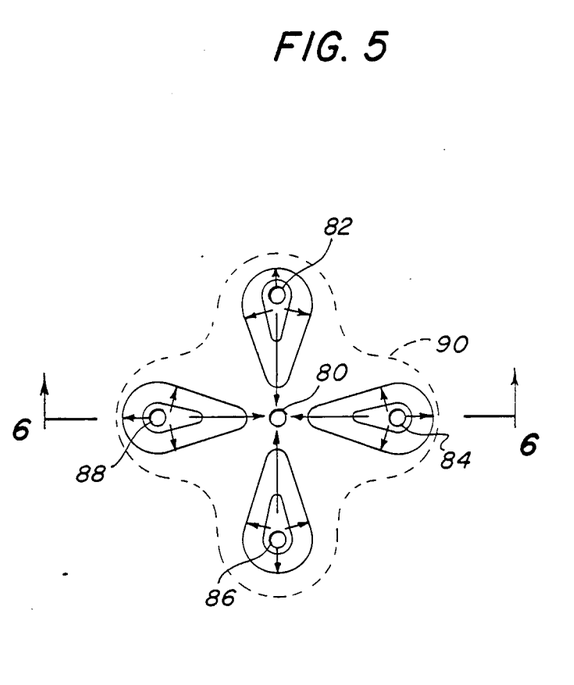
FIG. 5 is a plan view of an example of a plurality of recharging wells surrounding a single water lift well.
Figure 6:
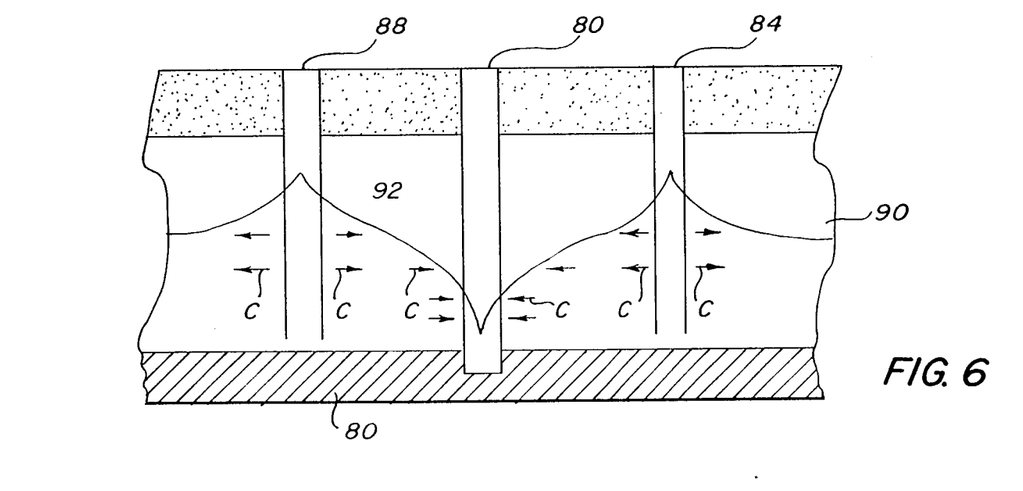
FIG. 6 is a cross-sectional view taken along section line 6—6 in FIG. 5 disclosing the relationship of recharging wells with respect to a central water lift well.
Figure 7:
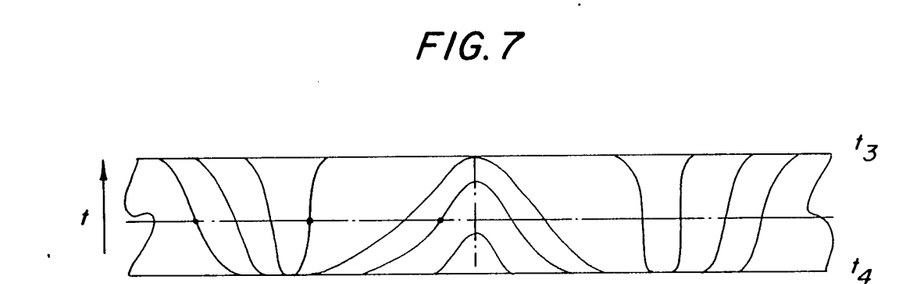
FIG. 7 is a schematic diagram illustrating the relative change of the ground water temperature as the ground water migrates from the recharging wells toward a central water lift well as illustrated in FIG. 6.

In FIGS. 5-7 there will be seen a water lift well 80 and a plurality of recharging wells for recycling ground water. In this connection, a water lift well 80 such as illustrated and previously discussed in connection with FIG. 1 is shown surrounded by a plurality of recharging wells 82 through 88. The recharging wells are peripherally spaced about the lifting well 80 and are spaced to be mutually equal distant as illustrated in FIG. 5.

The plurality of charging wells may be surrounded by an impervious layer or sheet 90 which is operable to contain subsurface water within a controlled region to facilitate containment and migration of the ground water toward the lifting well 80.

Turning specifically to FIG. 6, the impervious layer may be represented as being of variable thickness but in a preferred embodiment is relatively thin and is positioned beneath the water lifting well.

FIGS. 6 and 7 disclose changes in the level of the subsurface water and changes in its temperature as water is recirculated to be used in accordance with the invention. In this connection, the direction of moving subsurface water is indicated generally by arrows "C" which extend away from the recharging wells and toward the water lift well 80.

A bed of gravel such as crushed granite 90 may be positioned above the impervious layer 88 and serve as a heat transfer media as water migrates from the recharging wells 82-88 to the central water lifting well 80. The amount of subsurface water contained within the impervious or shallow aquifer is limited to a certain area within the radius of the water lifting well.

As illustrated by water level line 92 it will be seen that the subsurface water level changes from the position adjacent to the recharging well to the water lift well.

Referring specifically to FIG. 7, thre is shown a graphic display of the temperature of the subsurface water from temperature $T_4$ to temperature $T_3$. It will be seen that as water enters the recharging well it is at its lowest temperature $T_4$ and as the water migrates away from the recharging wells 82-88, it increases in temperature as illustrated.

Figure 8:
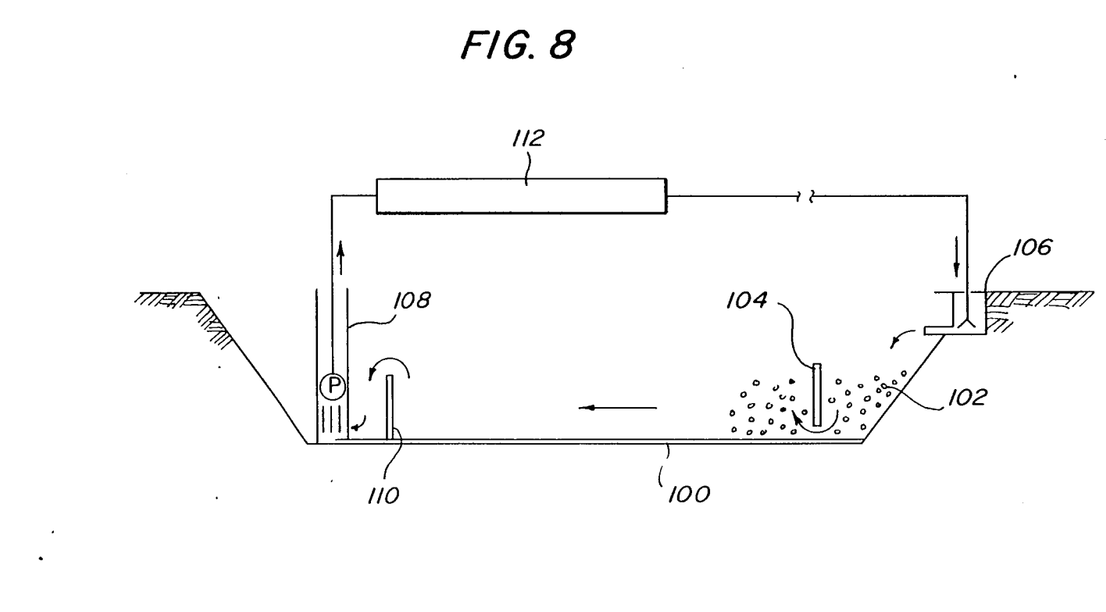
FIG. 8 is a sectional view of an arrangement of an artificial aquifer and structure advantageously utilized in areas where a supply of ground water is not sufficient and a reservoir is constructed beneath a ground surface for thermal transfer of heat from the ground to a surface to be isolated from snow accumulation in accordance with the invention.

Turning to FIG. 8, there is an illustration of a sectional view of an alternate preferred embodiment of the subject invention wherein an artificial aquifer is created to store solar heat within the ground where the natural water table of the surrounding earth is below thirty feet from the surface. In this connection, it will be seen that a reservoir has been dug and an impervious layer 100 has been laid upon the bed of the resevoir. The resevoir is then filled with crust aggregates such as granite 102 to provide a porous media which will facilitate heat transfer. The artificial aquifer is further provided with a first partition 104 adjacent to a return or recharging well 106. Returning water is forced to past beneath this partition and migrate laterally to a water lift well 108. Adjacent the water lift well is a second partition 110 which requires the water to pass over top of the partition and then down into filtering conduits for delivery to a heat exchange conduit system 112 as previously discussed.

The artificial aquifer discussed in connection with FIG. 8 may be rectangular, circular, trench shaped or exhibit other configurations and may lie beneath a roadway surface or adjacent thereto as best suits the geography of the surrounding terrain. With utilization of the artificial aquifer, where ground water is not plentiful at the surface, it is possible to store heat within the aggragate 120 during the spring, summer and fall months by circulating water through the system and absorbing heat into the water. This solar energy is then utilized during the winter months to extract heat from the crushed granite in a manner as previously discussed in connection with FIG. 1.

Methods for advantageously utilizing the subject passive snow melting system have been specifically and inherently disclosed in the proceeding but to summarize a method for reducing the accumulation of snow upon a roadway, parking lot, roof structure, or the like, includes the steps of positioning a heat exchange conduit system beneath a surface to be protected from snow buildup and pumping relatively warm subsurface water, having a temperature of approximately 60 degrees Fahrenheit, through a lift well and into the conduit system. The water traverses tortuosly through the conduit system and exchanges the subterranean heat at the surface thus melting relatively cool snow which falls upon a roadway at approximately 32 degrees Fahrenheit. As the water traverses through the conduit system, it is cooled and is discharged into one or more recharging wells to be deposited back into the earth bulk and/or into an artificial aquifer to be reheated to approximately 60 degrees Fahrenheit.

A non-return valve is maintained at the highest point between the water lift well and the conduit system and permits air to enter the conduit system upon termination of the subsurface water pumping operation. In addition, an air relief conduit or the like is maintained between the lifting and recharging wells so as to equalize air pressure between the two well environments and thus prevent a vacuum from being created within the water lifting well.

SUMMARY OF MAJOR ADVANTAGES OF THE INVENTION

After reading and understanding the foregoing description of the invention, in conjunction with the drawings, it will be appreciated that several advantages of the subject system and process for passively removing snow from a surface will be disclosed.

Without attempting to set forth all of the desirable features and advantages of the subject invention, at least one of the major advantages is the provision of a passive system which will operably utilize subsurface water at approximately 60 degrees Fahrenheit without spraying water directly on to a roadway surface which may precipitate an accumulation of ice.

The subject system advantageously facilitates snow removal and during periods of light snow is operable to be vented so that water will no tend to freeze within the distribution system near the system. An air relief conduit 50 positioned between water lifting and recharging wells prevents a vacuum from being created adjacent a relief valve and thus permits water to rapidly drain, by gravity, out of the conduit system.

The roadway compostion may be advantageously formulated of asphalt in combination with polyolefin and neoprene resins to enhance the heat transfer characteristics of the composition and thus facilitate melting of snow falling upon a roadway, roof or the like.

The conduit system is preferably composed of stainless steel which is pressed fit together to minimize corrosion and is capable of advantageously being replaced in the event of damage. The conduit system may include a single tortous path or comprise a plurality of mutually parallel sinusoidal conduits which traverse beneath a composition to be isolated from snow accumulation.

In areas of low natural ground water the subject method and apparatus is operable to be utilized in association with an artificial aquifer. A reservoir may be created by excavating a trench which may then be lined with an impervious layer and filled with crushed aggragate such as granite. Partitions within the artificial aquifer insure the tortuous passage of return water through the aggregate bed to facilitate heat transfer as the subsurface water is recharged to substantially the temperature of the earth environment.

In describing the invention, reference has been made to preferred embodiments and illustrative advantages of the invention. Those skilled in the art, however, and familiar with the instant disclosure of the subject invention may recognize additions, deletions, modifications, substitutions and/or other changes which will fall within the perview of the subject invention and claims.

What is claimed is:

1. A method for minimizing an accumulation of snow upon a roadway, parking lot, roof structure or the like comprising the steps of:
    positioning a heat exchange conduit system beneath a surface to be protected from snow accumulation;
    pumping relatively warm subsurface water from a lift well beneath the surface of the earth into the heat exchange conduit system to heat the surface and melt snow falling upon the surface;
    discharging the subsurface water from the heat exchange conduit system into at least one recharging well for delivery of the water back beneath the surface of the earth;
    maintaining a non-return valve positioned at the highest point between the water lift well and the heat exchange conduit system, said non-return valve permitting air to enter the conduit system upon termination of the subsurface water pumping operation; and
    maintaining an air relief conduit between the lift well and the at least one recharging well to equalize air pressure between said said water lift well and said at least one recharging well for preventing a vacuum from forming adjacent said non-return valve which might prevent air from entering the conduit system upon termination of subsurface water pumping operations.

2. A method for minimizing an accumulation of snow upon a roadway, parking lot, roof structure or the like as defined in claim 1 and further comprising these step of:
    forming a surface to be maintained free from snow buildup upon the heat exchange conduit system composed of a composition of paving asphalt, polyolefin resin a neoprene resin.

3. A method for minimizing an accumulation of snow upon a roadway, parking lot, roof structure or the like as defined in claim 1 and further comprising the step of:
    maintaining the inlet end of the heat exchange conduit system in a posture elevated with respect to the outlet end for permitting a gravity of flow water out of the conduit system upon termination of subsurface water pumping operation to minimize the tendency of the pipes to freeze.

4. A method for minimizing an accumulation of snow upon a roadway, parking lot, roof structure or the like as defined in claim 1 and further comprising the step of:
    constructing the heat exchange conduit system from stainless steel tubing which is press fit together prior to being embedded within an overlaying composition to be insulated from snow accumulation.

5. A method for minimizing an accumulation of snow upon a roadway, parking lot, roof structure or the like as defined in claim 1 and further comprising the steps of:
    forming a subsurface reservoir between said lift well and said at least one recharging well; and
    lining said reservoir with an impervious layer to facilitate a return flow of water into the water lift well.

6. A method for minimizing an accumulation of snow upon a roadway, parking lot, roof structure or the like as defined in claim 5 and further comprising the steps of:
    filling the reservoir with a heat retaining aggregate; and
    circulating water through the system during periods of temperatures in excess of 60 degrees farenheit to transfer solar energy from the ambient environment into the aggregate positioned in the reservoir.

7. A sprinklerless snow control system for minimizing an accumulation of snow upon an exterior surface, said snow control system comprising:
    a water lift well extending beneath the surface of the earth and positioned adjacent to an exterior surface to be protected from an accumulation of snow;
    a pump positioned within said water lift well for raising subsurface water having, a temperature of the subsurface environment;
    heat exchange conduit means positioned beneath the exterior surface to be protected from an accumulation of snow, for conveying the subsurface water and being operably connected at one end to said pump to receive the relatively warm subsurface water from said water lift well;

at least one recharging well positioned adjacent to the exterior surface to be protected from snow buildup but spaced from said water lift well and being operable to receive the subsurface water from the other end of said heat exchange conduit means;

a non-return valve positioned at the highest point between said pump and said heat exchange conduit means, said non-return valve permitting air to enter the heat exchange conduit system upon termination of subsurface water pumping operations; and conduit means extending between said water lift well and said at least one recharging well to equalize air pressure between said water lift well and said at least one recharging well and prevent a vacuum from forming adjacent said non-return valve which might prevent air from entering the conduit system upon termination of subsurface water pumping operations.

8. A sprinklerless snow control system for minimizing an accumulation of snow upon an exterior surface as defined in claim 7 wherein said heat exchange conduit means comprises:

a first conduit positioned at one edge of the surface to be protected from snow accumulation;

a second conduit positioned adjacent and opposing edge of the surface to be protected from snow accumulation; and a plurality of traversing conduits positioned between said first and second conduits for carrying relatively warm subsurface water beneath the exterior surface to be protected from an accumulation of snow.

9. A sprinklerless snow control system for minimizing an accumulation of snow upon an exterior surface as defined in claim 8 wherein;

said plurality of transversing conduits are sinusoidal in plan configuration but spaced in a mutually parallel posture to distribute heat from the relatively warm subsurface water generally uniformly beneath the exterior surface to be protected from snow accumulation.

10. A sprinklerless snow control system for minimizing an accumulation of snow upon an exterior surface as defined in claims 8 or 9 wherein:

said plurality of traversing conduits are composed of stainless steel which are connected to said first conduit and said second conduit by an interference fit.

11. A sprinklerless snow control system for minimizing an accumulation of snow upon an exterior surface as defined in claim 8 wherein:

said heat exchange conduit system is imbedded within a composition forming an exterior surface to be protected from an accumulation of snow.

12. A sprinklerless snow control system for minimizing an accumulation of snow upon an exterior surface as defined in claim 8 wherein:

said heat exchange conduit system is positioned beneath a composition of forming an exterior surface to be protected from an accumulation of snow.

13. A sprinklerless snow control system for minimizing an accumulation of snow upon an exterior surface as defined in claim 11 or 12 wherein:

said composition comprises a mixture of asphalt paving material and polyolefin resin and neoprene resin.

14. A sprinklerless snow control system for minimizing an accumulation of snow upon an exterior surface as defined in claim 7 wherein said at least one recharging well comprises:

at least four recharging wells positioned peripherally about a central water lift well and being generally uniformly spaced with respect to each other and said water lift well.

15. A sprinklerless snow control system for minimizing an accumulation of snow upon an exterior surface as defined in claim 1 and further comprising:

a reservoir positioned adjacent the surface to be protected from snow accumulation beneath the surface of the earth and said reservoir being composed of an impervious container positioned beneath the surface of the earth and being filled with aggreagate and said water lift well and said at least one recharging well extending in operative fluid communication with said reservoir.

16. A sprinklerless snow control system for minimizing an accumulation of snow upon an exterior surface as defined in claim 15 and further comprising:

at least one generally vertical partition positioned within said reservoir adjacent said at least one recharging well and having a passage beneath a lower most portion of the partition to permit subsurface water to be circulated from said at least one recharging well to said water lift well beneath said partition and through said aggregate; and at least a second generally vertical partition positioned within said reservoir adjacent said water lift well and extending to the bottom of said reservoir to subsurface water to pass over top of said generally vertical partition to create in combination with said at least a first generally vertical partition a tortuous path for returning subsurface water from said at least one recharging well to said water lift well to facilitate warming heat transfer between the subsurface water and aggregate positioned within said reservoir.

17. A sprinklerless snow control system for minimizing an accumulation of snow upon an exterior surface as defined in claim 16 wherein:

said aggregate comprises crushed granite stone.

18. A sprinklerless snow control system for minimizing an accumulation of snow upon an exterior surface as defined in claim 7 wherein:

said exterior surface comprises a roadway operable to receive pedestrian and vehicular traffic.

19. A sprinklerless snow control system for minimizing and accumulation of snow upon an exterior surface as defined in claim 7 wherein:

said exterior surface comprises a building roofing surface.

* * * * *